US009945975B2

(12) United States Patent
Song et al.

(10) Patent No.: US 9,945,975 B2
(45) Date of Patent: Apr. 17, 2018

(54) ACTIVE DAMPENING FOR A WELLBORE LOGGING TOOL USING ITERATIVE LEARNING TECHNIQUES

(71) Applicant: Halliburton Energy Services, Inc., Houston, TX (US)

(72) Inventors: Xingyong Song, Houston, TX (US); Yiming Zhao, Katy, TX (US); Jason D. Dykstra, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/324,598

(22) PCT Filed: Aug. 7, 2014

(86) PCT No.: PCT/US2014/050151
§ 371 (c)(1),
(2) Date: Jan. 6, 2017

(87) PCT Pub. No.: WO2016/022128
PCT Pub. Date: Feb. 11, 2016

(65) Prior Publication Data
US 2017/0205523 A1    Jul. 20, 2017

(51) Int. Cl.
*G01V 1/00* (2006.01)
*G01V 1/48* (2006.01)
(Continued)

(52) U.S. Cl.
CPC .............. *G01V 1/48* (2013.01); *E21B 49/003* (2013.01); *G01V 13/00* (2013.01); *E21B 47/16* (2013.01); *E21B 47/18* (2013.01); *G01V 2200/16* (2013.01)

(58) Field of Classification Search
CPC ...... E21B 47/16; E21B 47/18; G01V 2200/16
See application file for complete search history.

(56) References Cited

U.S. PATENT DOCUMENTS

| 4,796,237 | A | * | 1/1989 | Hutchens | ................ | G01S 7/527 |
| | | | | | | 181/105 |
| 5,216,638 | A | | 6/1993 | Wright | | |

(Continued)

FOREIGN PATENT DOCUMENTS

WO    03-071097 A1    8/2003

OTHER PUBLICATIONS

International Search Report and Written Opinion issued in related PCT Application No. PCT/US2014/050151 dated May 7, 2015, 16 pages.

(Continued)

*Primary Examiner* — Krystine E Breier
(74) *Attorney, Agent, or Firm* — Benjamin Fite; Baker Botts L.L.P.

(57) ABSTRACT

In accordance with some embodiments of the present disclosure, a method of vibration control for a wellbore logging tool is disclosed. The wellbore logging tool includes an acoustic transmitter. The method may include providing a braking signal to the acoustic transmitter. The braking signal may be based, at least in part, on at least one prior vibration in the acoustic transmitter. The method may include determining a present vibration in the acoustic transmitter after the braking signal has been provided to the acoustic transmitter. The method may include determining whether to update the braking signal and, if so, updating the braking signal based, at least in part, on the present vibration in the acoustic transmitter.

36 Claims, 6 Drawing Sheets

(51) Int. Cl.
*E21B 49/00* (2006.01)
*G01V 13/00* (2006.01)
*E21B 47/16* (2006.01)
*E21B 47/18* (2012.01)

(56) References Cited

U.S. PATENT DOCUMENTS

| | | |
|---|---|---|
| 5,640,371 A | 6/1997 | Schmidt et al. |
| 6,671,224 B1 | 12/2003 | Pabon |
| 6,837,332 B1 | 1/2005 | Rodney |
| 7,639,562 B2 | 12/2009 | Patterson et al. |
| 2006/0106541 A1 | 5/2006 | Hassan et al. |
| 2009/0005995 A1 | 1/2009 | Tang et al. |
| 2010/0097887 A1 | 4/2010 | Patterson et al. |
| 2016/0033663 A1* | 2/2016 | Lu ............................ G01V 1/40 367/25 |
| 2016/0238695 A1* | 8/2016 | Theurer ................ G01S 7/2923 |

OTHER PUBLICATIONS

International Preliminary Report on Patentability issued in related Application No. PCT/US2014/050151, dated Feb. 16, 2017 (8 pages).

Extended European Search Report issued in related EP Application No. 14899212.6, dated Jan. 30, 2018 (12 pages).

* cited by examiner

ACTIVE DAMPENING FOR A WELLBORE LOGGING TOOL USING ITERATIVE LEARNING TECHNIQUES

CROSS-REFERENCE TO RELATED APPLICATION

The present application is a U.S. National Stage Application of International Application No. PCT/US2014/050151 filed Aug. 7, 2014, which is incorporated herein by reference in its entirety for all purposes.

TECHNICAL FIELD

The present disclosure relates generally to well drilling and hydrocarbon recovery operations and, more particularly, to a system and method of vibration control for a wellbore logging tool.

BACKGROUND

Hydrocarbons, such as oil and gas, are commonly obtained from subterranean formations that may be located onshore or offshore. The development of subterranean operations and the processes involved in removing hydrocarbons from a subterranean formation typically involve a number of different steps such as, for example, drilling a wellbore at a desired well site, treating the wellbore to optimize production of hydrocarbons, and performing the necessary steps to produce and process the hydrocarbons from the subterranean formation.

When performing subterranean operations, it is often desirable to obtain information about the subterranean formation. One method of obtaining information about the formation is the use of a sonic well logging tool. A sonic well logging tool may emit an acoustic signal, which propagates through the formation to at least one receiver. The travel time of the acoustic signal from the tool to the receiver may be used to calculate the speed of the acoustic tone through the formation. Properties of the formation may be determined by comparing the speed of the acoustic tone to the speed of sound through various types of rock and fluid that may be encountered in subterranean operations.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
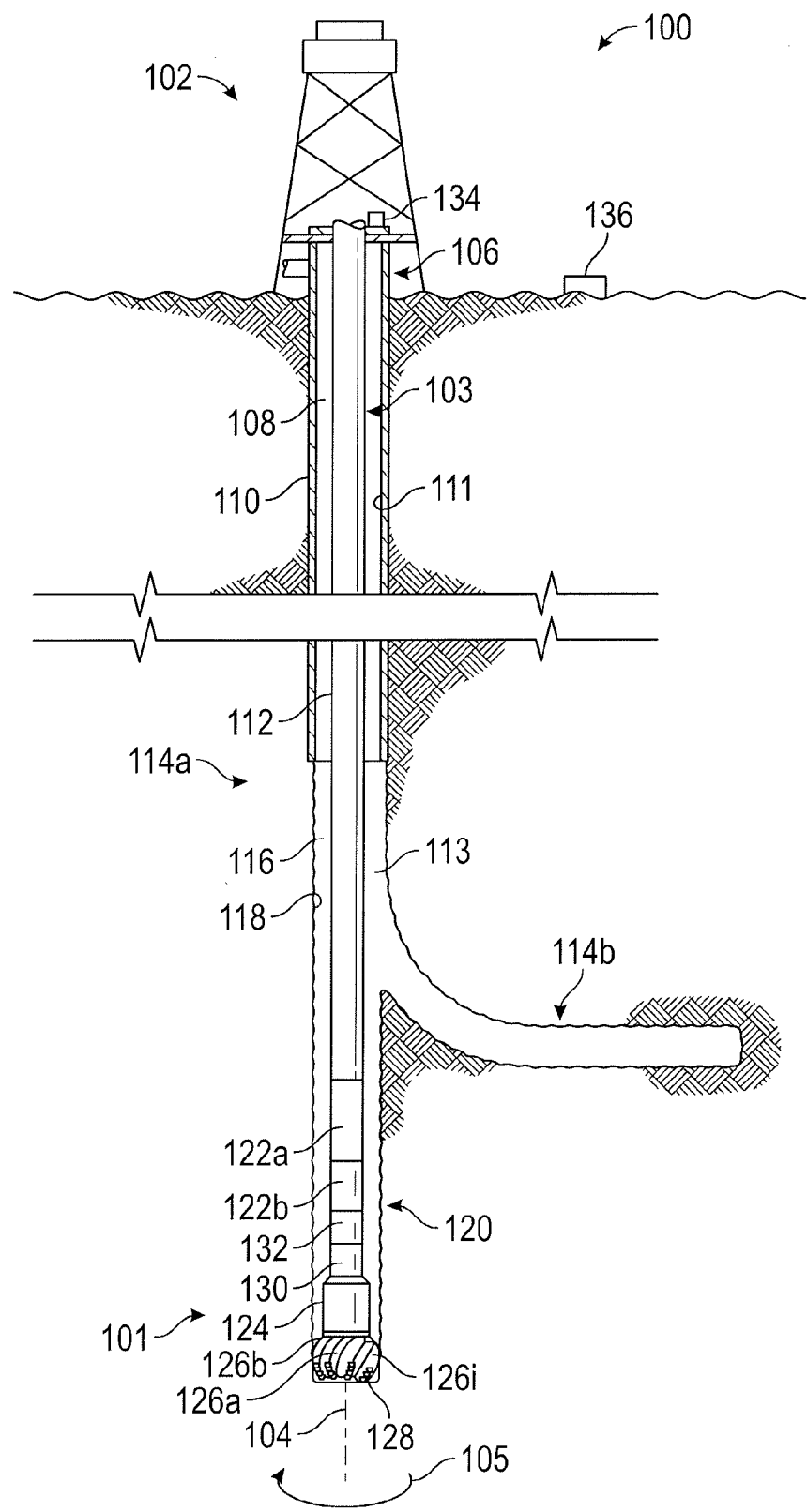
FIG. 1 illustrates an elevation view of an example embodiment of a drilling system used in an illustrative logging-while-drilling (LWD) environment, in accordance with some embodiments of the present disclosure.
Figure 2:
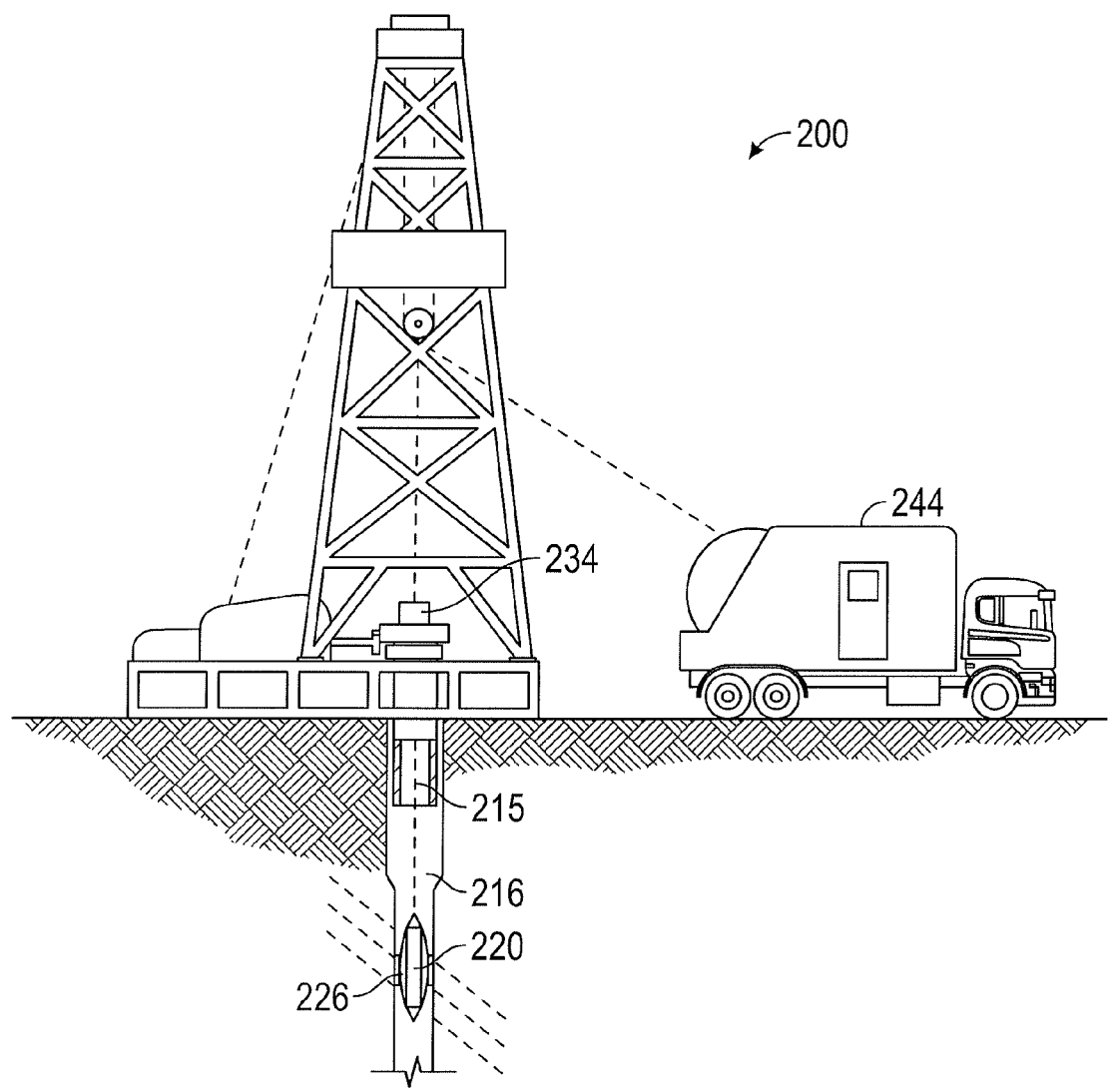
FIG. 2 illustrates an elevation view of an example embodiment of a downhole system used in an illustrative logging environment with the drill string removed, in accordance with some embodiments of the present disclosure.

The present disclosure describes an automated control system and method to optimize vibration control in a wellbore logging tool. The wellbore logging tool may be located on a drill string, as shown in FIG. 1, or on a wireline, as shown in FIG. 2. The wellbore logging tool may be any suitable type of wellbore logging tool, including a sonic logging tool that emits a signal in the form of an acoustic waveform. In some embodiments, components of the sonic logging tool, such as a transmitter or an actuator, may vibrate due to excitations during the process of generating the acoustic signal. The vibration of the components of the sonic logging tool, also known as "ringing," may be in the frequency range of the emitted acoustic signal. The ringing may result in lower quality data, may increase the time required to perform the logging, and may require more energy input into the logging tool. Accordingly, a system and method may be designed in accordance with the teachings of the present disclosure to reduce the ringing of the logging tool components and improve the quality of the acoustic signal emitted by the sonic logging tool, reduce the time and cost of performing wellbore logging, and reduce the total energy input requirements for the logging tool. To improve the efficiency of a subterranean operation, it may be desirable to avoid or to reduce the ringing in an acoustic transmitter that is part of the wellbore logging tool of FIG. 1 or FIG. 2. Although the automated control system and method described herein are directed to vibration control in a sonic logging tool, the vibration control system and method may be adapted to optimize other aspects of a subterranean operation including other types of wellbore logging tools. Embodiments of the present disclosure and its advantages are best understood by referring to FIGS. 1 through 8, where like numbers are used to indicate like and corresponding parts.

FIG. 1 illustrates an elevation view of an example embodiment of drilling system 100 used in an illustrative logging-while-drilling (LWD) environment, in accordance with some embodiments of the present disclosure. Modern petroleum drilling and production operations use information relating to parameters and conditions downhole. Several methods exist for collecting downhole information during subterranean operations, including LWD and wireline logging. In LWD, data is typically collected during a drilling process, thereby avoiding any need to remove the drilling assembly to insert a wireline logging tool. LWD consequently allows an operator of a drilling system to make accurate real-time modifications or corrections to optimize performance while minimizing down time. In wireline logging, a logging tool may be suspended in the wellbore from a wireline and the logging tool may take measurements of the wellbore and subterranean formation.

Drilling system 100 may include well surface or well site 106. Various types of drilling equipment such as a rotary table, drilling fluid pumps and drilling fluid tanks (not expressly shown) may be located at well surface or well site 106. For example, well site 106 may include drilling rig 102 that may have various characteristics and features associated with a "land drilling rig." However, downhole drilling tools incorporating teachings of the present disclosure may be satisfactorily used with drilling equipment located on offshore platforms, drill ships, semi-submersibles and drilling barges (not expressly shown).

Drilling system 100 may also include drill string 103 associated with drill bit 101 that may be used to form a wide variety of wellbores or bore holes such as generally vertical wellbore 114a or generally horizontal 114b wellbore or any other angle, curvature, or inclination. Various directional drilling techniques and associated components of bottom hole assembly (BHA) 120 of drill string 103 may be used to form horizontal wellbore 114b. For example, lateral forces may be applied to BHA 120 proximate kickoff location 113 to form generally horizontal wellbore 114b extending from generally vertical wellbore 114a. The term "directional drilling" may be used to describe drilling a wellbore or portions of a wellbore that extend at a desired angle or angles relative to vertical. The desired angles may be greater than normal variations associated with vertical wellbores. Direction drilling may also be described as drilling a wellbore deviated from vertical. The term "horizontal drilling" may be used to include drilling in a direction approximately ninety degrees (90°) from vertical but may generally refer to any wellbore not drilled only vertically. "Uphole" may be used to refer to a portion of wellbore 114 that is closer to well surface 106 via the path of the wellbore 114. "Downhole" may be used to refer to a portion of wellbore 114 that is further from well surface 106 via the path of the wellbore 114.

Wellbore 114 may be defined in part by casing string 110 that may extend from well surface 106 to a selected downhole location. Portions of wellbore 114, as shown in FIG. 1, that do not include casing string 110 may be described as "open hole." Various types of drilling fluid may be pumped from well surface 106 through drill string 103 to attached drill bit 101. The drilling fluids may be directed to flow from drill string 103 to respective nozzles passing through rotary drill bit 101. The drilling fluid may be circulated back to well surface 106 through annulus 108 defined in part by outside diameter 112 of drill string 103 and inside diameter 118 of wellbore 114. Inside diameter 118 may be referred to as the "sidewall" of wellbore 114. Annulus 108 may also be defined by outside diameter 112 of drill string 103 and inside diameter 111 of casing string 110. Open hole annulus 116 may be defined as sidewall 118 and outside diameter 112.

BHA 120 may be formed from a wide variety of components configured to form wellbore 114. For example, components 122a, and 122b of BHA 120 may include, but are not limited to, drill bits (e.g., drill bit 101), coring bits, drill collars, rotary steering tools, directional drilling tools, downhole drilling motors, reamers, hole enlargers or stabilizers. The number and types of components 122 included in BHA 120 may depend on anticipated downhole drilling conditions and the type of wellbore that will be formed by drill string 103 and rotary drill bit 101. BHA 120 may also include various types of well logging tools and other downhole tools associated with directional drilling of a wellbore. Examples of logging tools and/or directional drilling tools may include, but are not limited to, acoustic, neutron, gamma ray, density, photoelectric, nuclear magnetic resonance, induction, resistivity, caliper, coring, seismic, rotary steering and/or any other commercially available well tools. Further, BHA 120 may also include a rotary drive (not expressly shown) connected to components 122a, and 122b and which rotates at least part of drill string 103 together with components 122a, and 122b.

In the illustrated embodiment, logging tool 130 may be integrated with BHA 120 near drill bit 101 (e.g., within a drilling collar, for example a thick-walled tubular that provides weight and rigidity to aid in the drilling process, or a mandrel). In certain embodiments, drilling system 100 may include control unit 134, positioned at the surface, in drill string 103 (e.g., in BHA 120 and/or as part of logging tool 130) or both (e.g., a portion of the processing may occur downhole and a portion may occur at the surface). Control unit 134 may include a control system or a control algorithm for logging tool 130. Control unit 134 may be communicatively coupled to logging tool 130 and, in one or more embodiments, may be a component of logging tool 130. In certain embodiments, a control system, an algorithm, or a set of machine-readable instructions may cause control unit 134 to generate and transmit an input signal to one or more elements of logging tool 130. The input signal may be a drive signal (e.g., a signal used to generate the acoustic signal) or a braking signal (e.g., a signal used to dampen the vibration of logging tool 130). For example, control unit 134 may generate a braking signal for logging tool 130 based on the estimated vibration of logging tool 130, as discussed in more detail with reference to FIG. 4.

Logging tool 130 may be integrated into drilling system 100 at any point along the drill string 103. Logging tool 130 may include receivers (e.g., antennas) and/or acoustic transmitters capable of receiving and/or transmitting one or more acoustic signals. Logging tool 130 may further include one or more amplifiers to amplify a signal to the acoustic transmitters. The acoustic signals may facilitate recording measurements to determine the properties of the subterranean formation, including the type of rock and/or liquid (e.g., water, gas, or oil) in the formation. The acoustic transmitter may include any type of transmitter suitable for generating an acoustic signal, such as a solenoid or piezoelectric shaker. In other example embodiments, the acoustic transmitter may be pneumatic or hydraulic. In the case of a pneumatic acoustic transmitter or a hydraulic acoustic transmitter, the acoustic transmitter may include one or more cylinders or pistons and may be actuated by one or more valves. In some embodiments, logging tool 130 may include a transceiver array that functions as both an acoustic transmitter and a receiver. A drive signal may be transmitted by control unit 134 to logging tool 130 to cause logging tool 130 to emit an acoustic signal. In certain example embodiments, the control unit 134 is located in (or at least partially within) logging tool 130 and provides a drive signal to the acoustic transmitter within the logging tool 130. As the bit extends wellbore 114 through the formations, logging tool 130 may collect measurements relating to various formation properties as well as the tool orientation and position and various other drilling conditions. In some embodiments, logging tool 130 may include sensors to record measurements of an output signal of logging tool 130, such as the voltage of the logging tool or a voltage of a portion of the logging tool, such as the acoustic transmitter or the amplifier. The output signal of the logging tool 130 may be used to estimate the vibration of logging tool 130. In other example embodiments, the output signal may be measured at a component of the logging tool 130, such as the acoustic transmitter.

Telemetry sub 132 may be included on drill string 103 to transfer the measurements to surface receiver 136 and/or to receive commands from control unit 134 (when control unit 134 is at least partially located on the surface). Telemetry sub 132 may transmit downhole data to a surface receiver 30 and/or receive commands from the surface receiver 30.

Telemetry sub 132 may transmit data through one or more wired or wireless communications channels (e.g., wired pipe or electromagnetic propagation). Alternatively, telemetry sub 132 may transmit data as a series of pressure pulses or modulations within a flow of drilling fluid (e.g., mud-pulse or mud-siren telemetry), or as a series of acoustic pulses that propagate to the surface through a medium, such as the drill string. Drilling system 100 may also include facilities (not expressly shown) that include computing equipment configured to collect, process, and/or store the measurements received from receivers on logging tool 130 and/or surface receiver 136. The facilities may be located onsite at the wellbore or offsite at a location away from the wellbore.

Control unit 134 may transmit an input signal (e.g., a drive signal) to logging tool 130 that causes one or more acoustic transmitters of logging tool 130 to generate an acoustic signal. The input signal may be any suitable type of signal that causes the one or more acoustic transmitters of logging tool 130 to generate an acoustic signal, such as a voltage, a current, a pressure, or a fluid volume. The acoustic signal may propagate through the subterranean formation to at least one receiver, such as surface receiver 136, one or more receivers in the logging tool 130, or one or more receivers located elsewhere on the drillstring. The receiver may record the elapsed time between when the acoustic signal is emitted by logging tool 130 and when the acoustic signal is received by the receiver. The elapsed time may be used to calculate the speed of the acoustic signal through the subterranean formation, which may be compared to known values for the speed of sounds through various types of rocks and fluid to determine the properties of the subterranean formation.

When logging tool 130 emits an acoustic signal, the acoustic transmitter of the logging tool 130 may be excited and may vibrate or oscillate longer than is desired due to a residual vibration in the acoustic transmitter. In some embodiments, the residual vibration is cause, at least in part, by other portions of the logging tool 130. The frequency of the vibrations may be within the frequency range of the acoustic signal and may reduce the quality of the acoustic signal or may result in a longer operating period of logging tool 130 and may reduce the accuracy of measurements used to determine the properties of the subterranean formation. To reduce the impact of the vibrations, control unit 134 may include a vibration control system (shown in more detail in FIG. 3) to dampen the vibrations of one or more components of logging tool 130, including the acoustic transmitter. The vibration of logging tool 130 may continue after the drive signal causes logging tool 130 to emit an acoustic signal and may continue to affect the measurements of the subterranean formation. To dampen the residual vibration, the vibration control system may provide a braking signal to one or more portions of the logging tool 130. In one example embodiment, the braking signal is provided to the acoustic transmitter from the vibration control system to dampen the residual vibration in the acoustic transmitter. Depending on the nature of the acoustic transmitter, the braking signal may be a current, a voltage, a pressure, or a fluid volume provided to the acoustic transmitter to dampen the vibration of the acoustic transmitter of the logging tool 130.

The vibration control system may record an output signal of logging tool 130 or an output signal of a portion of the logging tool 130, such as the acoustic transmitter. The output signal may have three components: an input component generated by the input signal transmitted by control unit 134 to logging tool 130; a vibration component generated by the vibration of one or more components of logging tool 130, such as the transmitter; and a residual component generated by the transient response of components of logging tool 130 immediately after the input signal changes. The three components may depend on the characteristics and working conditions of logging tool 130.

When the input signal is not zero, the total output signal of logging tool 130 may not be accurately recorded because the input component may be large compared to the other components of the output signal and may prevent the measurement of the other components. Therefore, in certain example embodiments, the output signal is observed after the drive signal and braking signal (if any) have been transmitted to the to the logging tool 130, so that the output signal may contain only the component generated by the vibration of logging tool 130.

The vibration component of the output signal of logging tool 130 may depend on the type of acoustic transmitter used by logging tool 130 to generate the acoustic signal. For example, if logging tool 130 uses an electromagnetic mechanism to generate the acoustic signal, the vibration component may be generated by the relative motion between a coil and a permanent magnet in logging tool 130. This may be referred to as the "back-EMF signal." As another example, if logging tool 130 uses a piezoelectric mechanism to generate the acoustic signal, the vibration component may be generated by the varying pressure on the piezoelectric mechanism. In another example embodiment where the logging tool 130 uses a pneumatic or hydraulic mechanism to generate the acoustic signal, the vibration component may be generated by a varying pressure on one or more pistons, cylinder, or valves.

The residual component of the output signal of logging tool 130 may be generated by coil induction, capacitors in logging tool 130, and/or other suitable components in logging tool 130. There may be other components of the output signal in addition to the input component, the vibration component, and the residual component, but the other components may be minor and may not have a significant effect on the output signal. As an example, when the vibration component is generated by the relative motion between a coil and a permanent magnet in logging tool 130, the output signal may be measured by, while input voltage is suppressed and the transient signals have dissipated, recording the back electromotive force (EMF) signal.

Once the listening period has elapsed and the output signal of logging tool 130 is recorded, the vibration control system may estimate the vibration of logging tool 130 based on the recorded output signal. The vibration control system may estimate the amplitude, phase, frequency, and decay rate of the vibrations of logging tool 130. In other example embodiments, the vibration control system may estimate the vibration of the acoustic transmitter of the logging tool 130 based, for example, and an output signal of the acoustic transmitter. The vibration control system may estimate the amplitude, phase, frequency, and decay rate of the vibrations of the acoustic transmitter of logging tool 130

Drilling system 100 may also include rotary drill bit ("drill bit") 101. Drill bit 101 may include one or more blades 126 that may be disposed outwardly from exterior portions of rotary bit body 124 of drill bit 101. Blades 126 may be any suitable type of projections extending outwardly from rotary bit body 124. Drill bit 101 may rotate with respect to bit rotational axis 104 in a direction defined by directional arrow 105. Blades 126 may include one or more cutting elements 128 disposed outwardly from exterior portions of each blade 126. Blades 126 may also include one or more depth of cut controllers (not expressly shown)

configured to control the depth of cut of cutting elements 128. Blades 126 may further include one or more gage pads (not expressly shown) disposed on blades 126. Drill bit 101 may be designed and formed in accordance with teachings of the present disclosure and may have many different designs, configurations, and/or dimensions according to the particular application of drill bit 101.

At various times during the drilling process, drill string 103 may be removed from wellbore 114 and a wellbore logging tool may be used to obtain information about the subterranean formation. FIG. 2 illustrates an elevation view of an example embodiment of drilling system 200 used in an illustrative logging environment with the drill string removed, in accordance with some embodiments of the present disclosure. Subterranean operations may be conducted using wireline system 220 once the drill string has been removed, though, at times, some or all of the drill string may remain in wellbore 114 during logging with wireline system 220. Wireline system 220 may include one or more logging tools 226 that may be suspended in wellbore 216 by conveyance 215 (e.g., a cable, slickline, or coiled tubing). Logging tool 226 may be similar to logging tool 130, as described with reference to FIG. 1. Logging tool 226 may be communicatively coupled to conveyance 215. Conveyance 215 may contain conductors for transporting power to wireline system 220 and telemetry from logging tool 226 to logging facility 244. Alternatively, conveyance 215 may lack a conductor, as is often the case using slickline or coiled tubing, and wireline system 220 may contain a control unit similar to control unit 134, shown in FIG. 1, that contains memory, one or more batteries, and/or one or more processors for performing operations and storing measurements. In certain embodiments, system 200 may include control unit 234, positioned at the surface, in the wellbore (e.g., in conveyance 215 and/or as part of logging tool 226) or both (e.g., a portion of the processing may occur downhole and a portion may occur at the surface). Control unit 234 may include a control system or a control algorithm for logging tool 226. Control unit 234 may be communicatively coupled to logging tool 226 and, in one or more embodiments, may be a component of logging tool 226. In certain embodiments, a control system, an algorithm, or a set of machine-readable instructions may cause control unit 234 to generate and provide an input signal to one or more elements of logging tool 226, such as an amplifier or an acoustic transmitter. The input signal may be a drive signal (e.g., a signal used to generate the acoustic signal) or a braking signal (e.g., a signal used to dampen the vibration of logging tool 226 or a portion of logging tool 226, such as an acoustic transmitter). Logging facility 244 (shown in FIG. 2 as a truck, although it may be any other structure) may collect measurements from logging tool 226, and may include computing facilities for controlling, processing, or storing the measurements gathered by logging tool 226. The computing facilities may be communicatively coupled to logging tool 226 by way of conveyance 215 and may operate similarly to control unit 134 and/or surface receiver 136, as shown in FIG. 1. In certain example embodiments, control unit 234, which may be located in logging tool 226, may perform one or more functions of the computing facility. An example of a computing facility is described with more detail with reference to FIG. 3.

As described with respect to logging tool 130 in FIG. 1, one or more portions of logging tool 226 may vibrate, or ring, after emitting an acoustic signal during a subterranean operation. In certain example embodiments, the acoustic transmitter of logging tool 226 may vibrate, or ring, after emitting an acoustic signal during a subterranean operation. The ringing may be in the frequency range of the acoustic signal emitted by the acoustic transmitter of the logging tool. In certain embodiments this ringing decreases the quality of the acoustic signal. The decrease in signal quality may increase the logging time or may result in higher energy requirements for logging tool 226. Therefore, it may be advantageous to reduce the ringing of one or more components of logging tool 226, as discussed in further detail with respect to FIG. 4. For example, a system or method may dampen the ringing of the acoustic transmitter of logging tool 226 and may improve the quality of the acoustic signal. One method for dampening the ringing of the acoustic transmitter of logging tool 226 may be through the use of a vibration control system. A vibration control system, which may be included in the computing facilities of logging facility 244, control unit 234, or a component of logging tool 226, may include a listening period, after an input signal is transmitted to logging tool 226, to record the output signal of logging tool 226. The input signal may be a drive signal (e.g., a signal used to generate the acoustic signal) or a braking signal (e.g., a signal used to dampen the vibration of the acoustic transmitter of logging tool 226). As such, systems and methods designed according to the present disclosure may enable more accurate and more efficient measurements of the subterranean formation.

Figure 3A:
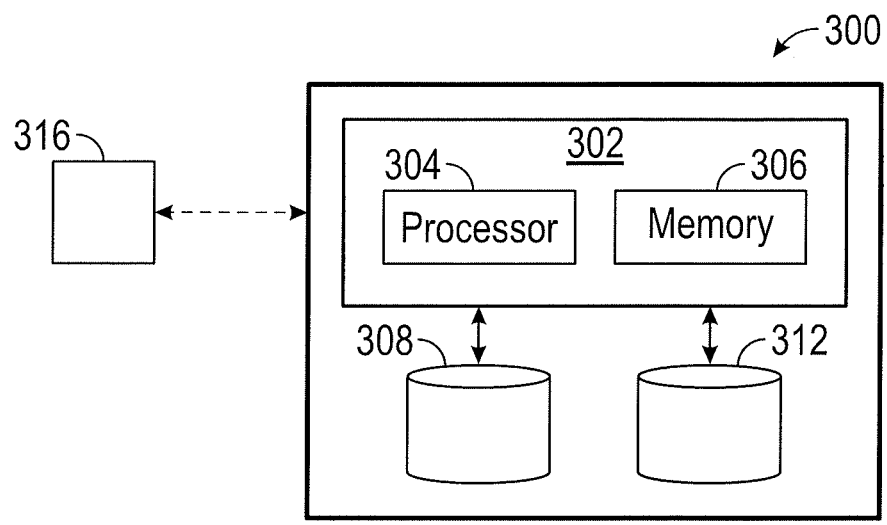
FIG. 3A illustrates a block diagram of an exemplary vibration control system for a wellbore logging tool, in accordance with some embodiments of the present disclosure.

FIG. 3A illustrates a block diagram of an exemplary control unit 300 for a logging tool, in accordance with some embodiments of the present disclosure. Control unit 300 may be configured to provide an input signal to and perform vibration control for a wellbore logging tool, such as logging tool 130 or logging tool 226. In certain example embodiments control until 300 may be configured to provide an input signal to an acoustic transmitter or to an amplifier in a wellbore logging tool. In some embodiments, control unit 300 may include vibration control system 302. Vibration control system 302 may be used to perform the steps of method 400 as described with respect to FIGS. 4-7. Vibration control system 302 may include any suitable components. For example, in some embodiments, vibration control system 302 may include processor 304. Processor 304 may include, for example a microprocessor, microcontroller, digital signal processor (DSP), application specific integrated circuit (ASIC), or any other digital or analog circuitry configured to interpret and/or execute program instructions and/or process data. In some embodiments, processor 304 may be communicatively coupled to memory 306. Processor 304 may be configured to interpret and/or execute program instructions and/or data stored in memory 306. Program instructions or data may constitute portions of software for carrying out the design of a vibration control system for a wellbore logging tool, as described herein. Memory 306 may include any system, device, or apparatus configured to hold and/or house one or more memory modules; for example, memory 306 may include read-only memory, random access memory, solid state memory, or disk-based memory. Each memory module may include any system, device or apparatus configured to retain program instructions and/or data for a period of time (e.g., computer-readable non-transitory media).

Control unit 300 may further include braking signal database 308. Braking signal database 308 may be communicatively coupled to vibration control system 302 and may provide values that may be used to generate a braking signal in response to a query or call by vibration control system 302. Braking signal database 308 may be implemented in any suitable manner, such as by functions, instructions, logic, or code, and may be stored in, for example, a relational database, file, application programming interface, library, shared library, record, data structure, service, software-as-service, or any other suitable mechanism. Braking signal database 308 may include code for controlling its operation such as functions, instructions, or logic. Braking signal database 308 may specify any suitable parameters that may be used to generate a braking signal to reduce the vibration of a logging tool, such as amplitude, frequency, phase, and decay rate of the vibration.

Control unit 300 may further include vibration estimation database 312. Vibration estimation database 312 may be communicatively coupled to vibration control system 302 and may provide vibration estimation parameters for a logging tool in response to a query or call by vibration control system 302. Vibration estimation database 312 may be implemented in any suitable manner, such as by functions, instructions, logic, or code, and may be stored in, for example, a relational database, file, application programming interface, library, shared library, record, data structure, service, software-as-service, or any other suitable mechanism. Vibration estimation database 312 may include code for controlling its operation such as functions, instructions, or logic. Vibration estimation database 312 may specify any suitable properties of the logging tool that may be used for estimating the vibration of the logging tool or a portion of the logging tool (e.g., the acoustic transmitter), such as the acceleration, speed, and energy consumption rate of the logging tool. Although control unit 300 is illustrated as including two databases, control unit 300 may contain any suitable number of databases.

In some embodiments, vibration control system 302 may be configured to generate signals for vibration control for a wellbore logging tool. In some embodiments, vibration control system 302 may be configured to generate signals for vibration control for the acoustic transmitter of the wellbore logging tool. For example, vibration control system 302 may be configured to import one or more instances of braking signal database 308, and/or one or more instances of vibration estimation database 312. Values from braking signal database 308, and/or vibration estimation database 312 may be stored in memory 306. Vibration control system 302 may be further configured to cause processor 304 to execute program instructions operable to generate signals for vibration control for a wellbore logging tool. For example, processor 304 may, based on values in braking signal database 308 and vibration estimation database 312, monitor the vibration of a logging tool as a result of vibration created in the logging tool during and after which the logging tool generates an acoustic signal and may iteratively update a braking signal for the logging tool to dampen the vibration, as discussed in further detail with reference to FIG. 4.

Control unit 300 may be communicatively coupled to one or more displays 316 such that information processed by vibration control system 302 (e.g., input signals for the logging tool) may be conveyed to operators of drilling and logging equipment at the wellsite or may be displayed at a location offsite.

Modifications, additions, or omissions may be made to FIG. 3 without departing from the scope of the present disclosure. For example, FIG. 3 shows a particular configuration of components for control unit 300. However, any suitable configurations of components may be used. For example, components of control unit 300 may be implemented either as physical or logical components. Furthermore, in some embodiments, functionality associated with components of control unit 300 may be implemented in special purpose circuits or components. In other embodiments, functionality associated with components of control unit 300 may be implemented in a general purpose circuit or components of a general purpose circuit. For example, components of control unit 300 may be implemented by computer program instructions. Control unit 300 or components thereof can be located at the surface, downhole (e.g., in the BHA and/or in the logging tool), or some combination of both locations (e.g., certain components could be disposed at the surface and certain components could be disposed downhole, where the surface components are communicatively coupled to the downhole components).

Figure 3B:
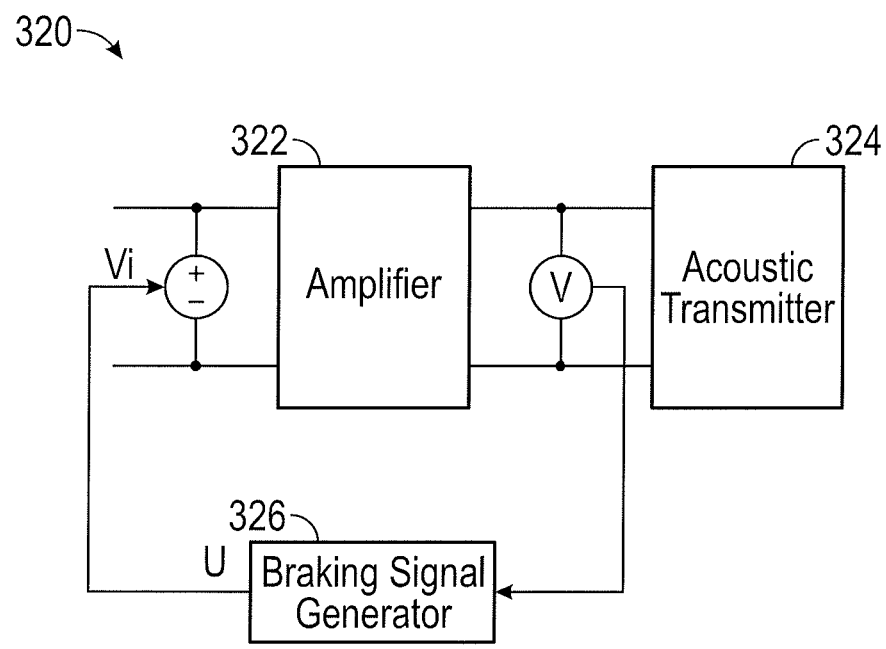
FIG. 3B illustrates a block diagram of an exemplary acoustic wellbore logging tool including a braking signal generator, in accordance with some embodiments of the present disclosure.

FIG. 3B illustrates a block diagram of an exemplary acoustic wellbore logging tool including a braking signal generator, in accordance with some embodiments of the present disclosure. Amplifier 322 and acoustic transmitter 324 may be components of a logging tool, such as logging tool 130 or logging tool 226, shown in FIGS. 1 and 2, respectively. During the listening period, the voltage output from amplifier 322 may be measured and sent to braking signal generator 326. The voltage output from amplifier 322 may be generated by the vibration of acoustic transmitter 324. Braking signal generator 326 may use information about the voltage to determine the amplitude, frequency, or phase of the vibration of acoustic transmitter 324 to generate a braking signal to send to amplifier 322 to dampen the vibration of acoustic transmitter 324.

In the embodiment shown in FIG. 3B, the braking signal may be generated based on the measurement of the output voltage of amplifier 322 and no other measurements. The magnitude of the output voltage of amplifier 322 may correspond to the magnitude of the vibration of acoustic transmitter 324. For example, an output voltage of amplifier 322 having a small magnitude may correspond to a vibration of acoustic transmitter 324 having a small magnitude. The magnitude of the output voltage of amplifier 322 and the vibration of acoustic transmitter 324 may not be completely reduced to zero after one or more braking signals due to noise.

The vibration of a logging tool, such as logging tool 130 as shown in FIG. 1 or logging tool 226 as shown in FIG. 2, may be described as a oscillating system with a behavior that may be described as a function of one or more of amplitude, frequency, phase, decay rate. The vibration of a component of the logging tool 130, such as the acoustic transmitter of logging tool 130 as shown in FIG. 1 or logging tool 226 as shown in FIG. 2, may also be described as a oscillating system with a behavior that may be described as a function of one or more of amplitude, frequency, phase, decay rate. In certain example embodiments, one or more of amplitude, frequency, phase, decay rate are scalars. In other example embodiments, one or more of amplitude, frequency, phase, decay rate are vectors. In still other embodiments, the vibration of logging tool may further be a function of one or more non-linear terms. These non-linear terms may include, for example, one or more natural frequencies of the logging tool. Other non-linear terms may include, in the case of logging tool 130, one or more natural frequencies of the drill string. Still other non-linear terms may include, in the case of the logging tool 226, one or more natural frequencies of the conveyance 215. Other non-linear terms include natural frequencies of the borehole. Vibration control may then be provided in an iterative learning manner, using for example an iterative learning algorithm. The use of such an iterative learning algorithm may be desirable in situations where it may be difficult to obtain a model or in situations where a model may not be sufficiently accurate. The vibration control system 302 of the present disclosure may provide a braking signal that may be described by a nonlinear function $f$: $u(t)=f$ (frequency, amplitude, phase, decay parameters, other parameters).

The function $f$ could be a nonlinear function determined by one or more parameters, including, for example, frequency, amplitude, phase, decay rate, time t, and other known parameters. One particular form of the control function $f$ could be:

$$f = A \sin(\omega t + \varphi) e^{-\tau t} \quad \text{(Eq. 1)}$$

where A is the amplitude, $\omega$ is the frequency of a sinusoid, $\varphi$ is the phase of the sinusoid, $\tau$ is the decay rate of the exponential function, and t is the time elapsed for one firing cycle. In other example embodiments, the function $f$ may take other forms. In one example embodiment, rather than decaying at an exponential rate, the amplitude of the sinusoid signal could go up first and then come down. The braking signal may be referred to in a general form $f$ in the following set of equations that describe the drive signal and braking signal sent to the acoustic transmitter of the wellbore logging tool for a single shot cycle:

$$u(t) = g(t) \text{(when } t < t_{bound}) \quad \text{(Eq.2)}$$

$$u(t) = f(t, \text{Frequency,Amplitude,decay rate,phase,other parameters})(\text{when } t > t_{bound}) \quad \text{(Eq. 3)}$$

where $t_{bound}$ is the timing at the end of the drive signal and the start of the braking signal. Note that the time t in the equation above is time elapsed during one firing cycle. The function g(t) is the original drive signal.

Figure 4:
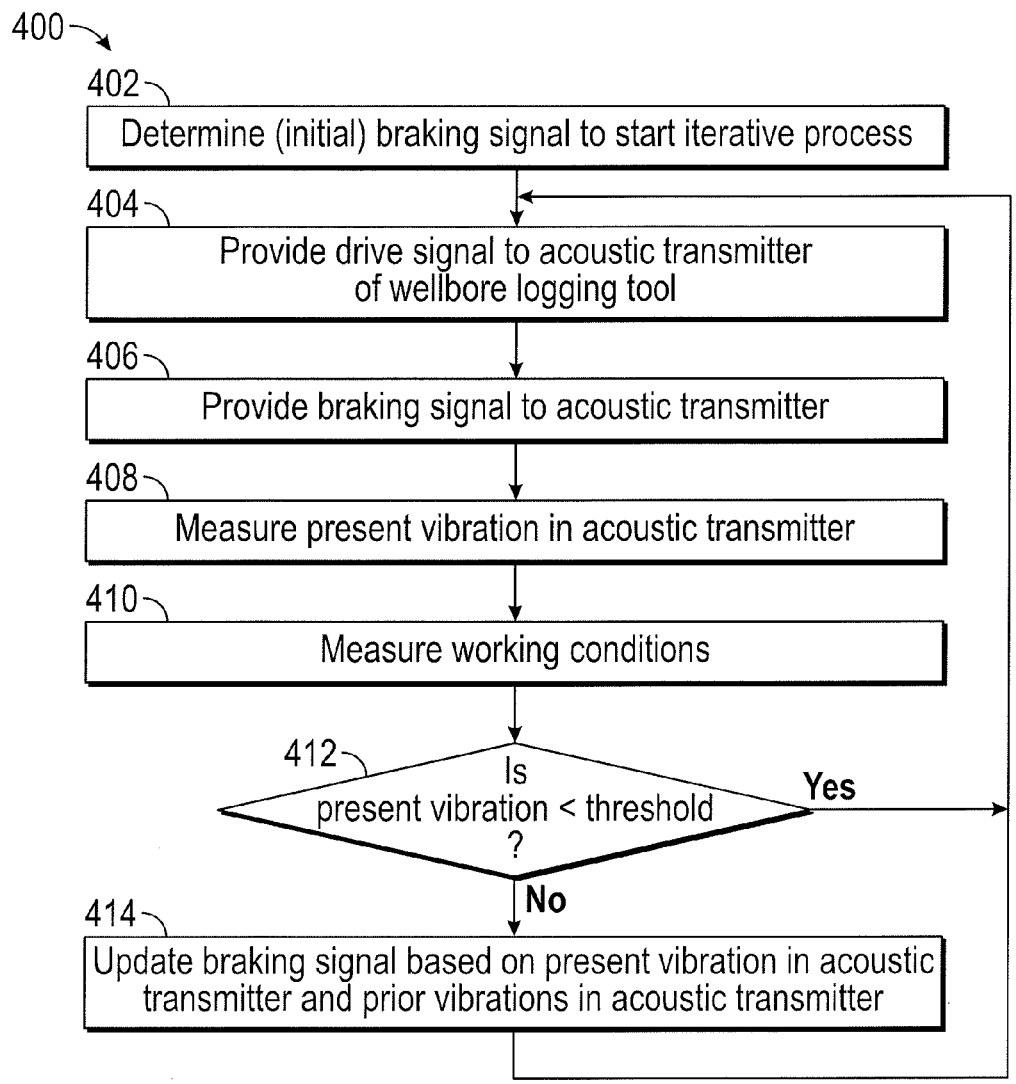
FIGS. 4-7 illustrates flow charts of methods of vibration control for a wellbore logging tool, in accordance with some embodiments of the present disclosure.

FIG. 4 illustrates a flow chart of a method 400 for vibration control of an acoustic transmitter of the wellbore logging tool, in accordance with some embodiments of the present disclosure. The steps of method 400 may be performed by various computer programs, models, or any combination thereof, configured to simulate and design drilling systems, apparatuses and devices, such as the vibration control system illustrated in FIG. 3. For illustrative purposes, method 400 is described with respect to the drilling or logging systems as illustrated in the previous FIGURES; however, method 400 may be used to provide vibration control for any logging tool in any drilling or logging system.

At step 402, the vibration control system 302 determines an initial braking signal to start the iterative braking signal determination process. In certain example embodiments, like that described with respect to FIG. 5 below, the vibration control system 302 may determine an initial braking signal in an open-loop manner. In other example embodiments, like that described with respect to FIG. 6 below, the vibration control system 302 may determine an initial braking signal by looking up a braking signal in a database, such as braking signal database 308 or another offline database or table. In some embodiments, the initial braking signal is based on one or more operating conditions, such as temperature and pressure at or around the wellbore logging tool.

After the initial braking signal has been established, at step 404, the control system 300 starts the process of acoustic firing cycles by providing a drive signal to the acoustic transmitter of the wellbore logging tool. In certain example embodiments a signal, such as the drive signal is that is provided to the acoustic transmitter is altered by one or more intermediate elements. In one example embodiment, the drive signal (or another signal from the control system 300) is amplified by an amplifier before being applied to the acoustic transmitter. The drive signal causes the acoustic transmitter of the wellbore logging tool to generate an acoustic signal. The acoustic signal may be used to calculate the properties of a subterranean formation by recording the travel time of the acoustic signal through the formation. In general, the acoustic signal generated by the wellbore logging tool is to interact with the subterranean formation and be received by one or more receivers. In certain embodiments, one or more receivers are located at the surface. In still other embodiments, an array of receiver is located on the logging tool 226. A difference in one or more of time, frequency, or phase of the transmitted acoustic signals and received acoustic signals may be indicative of one or more properties of the subterranean formation.

At step 406, the vibration control system 302 causes the control system 300 to provide the braking signal to the acoustic transmitter. For the case where the process has not yet reached step 414, the braking signal is the initial braking control signal, as determined at step 402. Otherwise, the braking signal may have been updated by the vibration control system 302, as described below. As described above, the braking signal causes an acoustic transmitter in the wellbore logging tool to emit an acoustic signal that will actively dampen ringing in the wellbore logging tool.

At step 408, the vibration control system 302 measures the vibration component of the output signal from the wellbore logging tool for the current firing cycle. In one example embodiment, the vibration control system measures a vibration of the acoustic transmitter. The present vibration may be characterized by one or more of an amplitude, a frequency, a phase, and a decay rate. In certain embodiments, one or more of the amplitude, the frequency, the phase, and the decay rate are vectors. In other embodiments, where it is not possible to measure one or more of the amplitude, the frequency, the phase, and the decay rate in multiple dimensions, these are scalar values. Where the wellbore logging tool includes an electromagnetic acoustic transmitter, which may also be referred to as an electromagnetic shaker, the vibration may be determined by observing and measuring the back EMF voltage across the electromagnetic transmitter or the voltage across an amplifier. In certain example embodiments it may not be possible to measure the back EMF voltage while the braking signal is being provided to the acoustic transmitters. In certain embodiments, therefore, the vibration control system measures the back EMF voltage after the braking signal is terminated to the acoustic transmitter. Where the wellbore logging tool includes piezoelectric acoustic transmitter, the vibration may be determined by observing and measuring a current induced in the piezoelectric material based on a pressure exerted on the piezoelectric material by the pressure of the vibration. In certain example embodiments this current may not be observable while the braking signal is being provided to the acoustic transmitter. In certain embodiments, therefore, the vibration control system measures the current caused by the vibration after the braking signal is terminated to the acoustic transmitter. Where the wellbore logging tool includes a pneumatic or hydraulic acoustic transmitter, the vibration may be determined by observing and measuring a pressure exerted on one or more pistons, cylinders, or valves of the transmitter.

In some example embodiments, other values may be used to determine the present vibration in the acoustic transmitter. In some example embodiments, an acceleration measurement from an accelerometer located on or about the acoustic transmitter or from an accelerometer located on or about another portion of the wellbore logging tool is at least one factor in determining a present vibration in the wellbore logging tool. In other example embodiments, one or more stress or strain measurements, from sensors affixed to or in the acoustic transmitter or elsewhere on the wellbore logging tool are at least one factor in determining a present vibration in the acoustic transmitter. In other example embodiments, signal received at one or more receivers are used as a factor to determine the present vibration in the wellbore logging tool. In general, the vibration control system 302 evaluates these measurements for times after the braking signal has been applied to the wellbore logging tool.

At step 410, the vibration control system 302 measures one or more current working conditions. The working condition may include temperatures and pressures at the wellbore logging tool's location in the borehole. These temperature and pressure measurements may be used, for example, to look up corresponding braking signals from braking signal database 308.

At step 412, the vibration control system 302 determines if the present vibration is less than a vibration threshold. The vibration threshold may be based on the value of a single one of the amplitude, the phase, the frequency, and the decay rate of the present vibration or it may be based on a function of one or more of, the amplitude, the phase, the frequency, and the decay rate of the present vibration. In one example embodiment, the vibration control system 302 sets threshold vibration amplitude. If the present vibration is within or below the vibration threshold then the control system returns to step 404 to continue with the sonic logging process by providing a drive signal to the acoustic transmitter of the wellbore logging tool. In some example implementations, there is a delay before the next drive signal is provided to the acoustic transmitter of the wellbore logging tool. Otherwise, if the present vibration is not below or within the vibration threshold, the vibration control system 302 proceeds to step 414.

In step 414, the vibration control system 302 updates the braking signal based on at least the present vibration in the acoustic transmitter. As described in greater detail with respect to FIG. 7 below, the vibration control system 302 may also update the braking signal based on prior vibrations in the acoustic transmitter. After the vibration control system 302 updates the drive signal, control system returns to step 404 to continue with the sonic logging process by providing a drive signal to the acoustic transmitter. In some example implementations, there is a delay before the next drive signal is provided to the acoustic transmitter.

Figure 5:
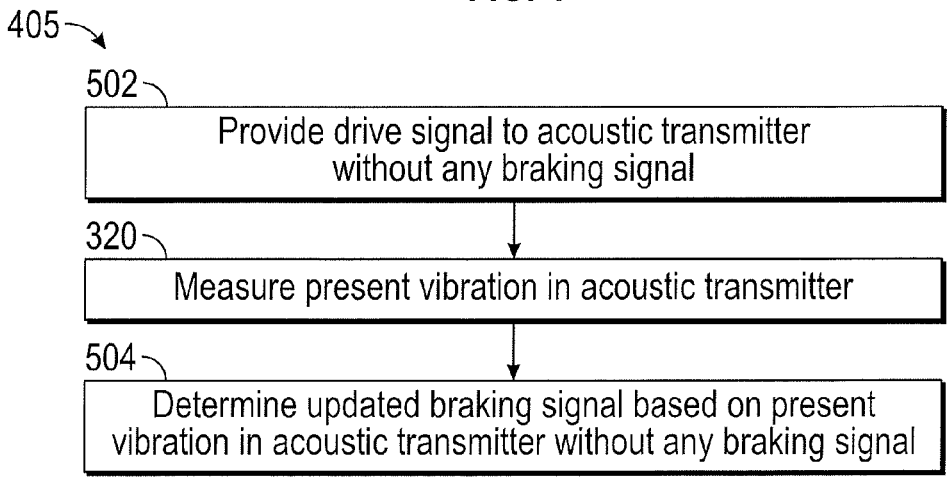

FIG. 5 illustrates a flow chart of an example method 402 for determining an initial braking signal to start the iterative braking signal determination process. In step 502, the logging tool vibration control system transmits a drive signal to the wellbore logging tool without a breaking signal. Next, as described above with respect to step 320, the logging tool vibration control system measures the present vibration in the acoustic transmitter in response to the signal provided to the acoustic transmitter at step 502. The present vibration may be characterized by one or more of an amplitude, a frequency, a phase, and a decay rate. In certain embodiments, one or more of the amplitude, the frequency, the phase, and the decay rate are vectors. In other embodiments, where it is not possible to measure one or more of the amplitude, the frequency, the phase, and the decay rate in multiple dimensions, then these may be scalar values. Based on at least the present vibration in the acoustic transmitter, the vibration control system 302 determine a braking signal based, at least in part, on the measured present vibration in the acoustic transmitter. In one example embodiment, the braking signal for the next firing round is determined by the following equation:

$$u(t) = f(t, \omega_{learnt}^1, \text{Amplitude}, \text{decay rate}, \varphi_{learnt}^1) \quad \text{(when } t > t_{bound}) \quad \text{(Eq. 4)}$$

where the frequency ($\omega_{learnt}^1$) and the phase ($\varphi_{learnt}^1$) are based, at least in part, on the measured frequency and phase of the vibration in acoustic transmitter. In certain example embodiments, the amplitude and decay rate in the function above are based on a database or table query. The query is based on one or more of the measured frequency and phase of the vibration. In certain example implementations, the query is further based on operating conditions, such as temperature and pressure. In still other implementations, the resulting braking signal is based, at least in part, on one or more of the natural frequency of the wellbore logging tool, the acoustic transmitter, one or more other components of the wellbore logging tool, the conveyance, and the borehole.

Figure 6:

FIG. 6 illustrates a flow chart of another example method 402 for determining initial braking signal to start the iterative braking signal determination process. At step 605, the vibration control system 302 uses a predetermined braking signal based, at least in part, on one or more operating conditions. In certain example embodiments the operating conditions may include one or both of temperature and pressure. In one example embodiment the vibration control system 302 queries braking signal database 308 to determine an initial braking signal.

Modifications, additions, or omissions may be made to method 400 without departing from the scope of the present disclosure. For example, the order of the steps may be performed in a different manner than that described and some steps may be performed at the same time. Additionally, each individual step may include additional steps without departing from the scope of the present disclosure.

Figure 7:
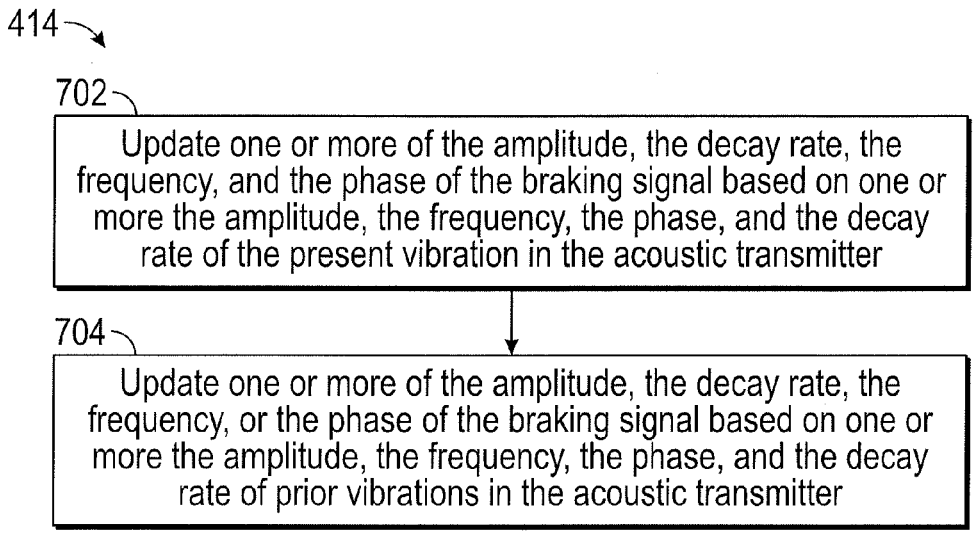

FIG. 7 illustrates an example method of updating the braking signal based, at least in part, on the present vibration in the acoustic transmitter.

In step 702, the vibration control system 302 updates one or more of the amplitude, the decay rate, the frequency, and the phase of the braking signal based, at least in part, on one or more properties of the present vibration in the acoustic transmitter. The properties of the present vibration may include one or more of the amplitude, the frequency, the phase, and the decay rate of the present vibration.

In one example embodiment, the vibration control system 302 updates one or more of the amplitude, decay rate, frequency, and phase of the brake signal based on the following equations:

$$A^{i+1} = A^i - \frac{dE_i}{dA^i} \times E_i \times \text{step}_A^i \quad \text{(Eq. 5)}$$

$$\tau^{i+1} = \tau^i - \frac{dE_i}{d\tau^i} \times E_i \times \text{step}_\tau^i \quad \text{(Eq. 6)}$$

$$\omega^{i+1} = A^i - \frac{dE_i}{d\omega^i} \times E_i \times \text{step}_\omega^i \quad \text{(Eq. 7)}$$

$$\phi^{i+1} = \phi^i - \frac{dE_i}{d\phi^i} \times E_i \times \text{step}_\phi^i \quad \text{(Eq. 8)}$$

where the $\text{step}_A^i$ is a positive step value for the learning update. In certain example embodiments, the value of $\text{step}_A^i$ could be chosen following an algorithm. One example algorithm is the exact line search algorithm. In other example embodiments, the value of step$_A^i$ is obtained for a table or database based on one or more of the amplitude, decay rate, frequency, phase, one or more environmental conditions (e.g., one or both of a pressure and a temperature at or around the wellbore logging tool.) In certain example embodiments, an update to the braking signal may be based on one or more of the natural frequencies of the wellbore logging tool, the acoustic transmitter, one or more other components of the wellbore logging tool, the conveyance, and the borehole.

In step 704, the vibration control system 302 may update one or more of the amplitude, the decay rate, the frequency, and the phase of the braking signal based, at least in part, on one or more properties of prior vibrations in the acoustic transmitter. The properties of the prior vibrations may include one or more of the amplitude, the frequency, the phase, and the decay rate of the present vibration.

In other example embodiments, the vibration control system 302 updates the braking signal based on one or more prior vibrations in the acoustic transmitter from prior shot cycles. In another example embodiment, the vibration control system 302 updates one or more of the amplitude, decay rate, frequency, and phase of the brake signal based on the following equations:

$$A^{i+1}=A^i-\text{sign}(A^i-A^{i-1})\text{sign}(E_i-E_{i-1})\times E_i\times \text{step}_A^i \quad \text{(Eq. 9)}$$

$$\tau^{i+1}=\tau^i-\text{sign}(\tau^i-\tau^{i-1})\text{sign}(E_i-E_{i-1})\times E_i\times \text{step}_\tau^i \quad \text{(Eq. 10)}$$

$$\omega^{i+1}=\omega^i-\text{sign}(\omega^i-\omega^{i-1})\text{sign}(E_i-E_{i-1})\times E_i\times \text{step}_\omega^i \quad \text{(Eq. 11)}$$

$$\varphi^{i+1}=\varphi^i-\text{sign}(\varphi^i-\varphi^{i-1})\text{sign}(E_i-E_{i-1})\times E_i\times \text{step}_\varphi^i \quad \text{(Eq. 12)}$$

In other example embodiments, the vibration control system 302 applies a perturbation function to one of the amplitude, decay rate, frequency, or phase of the braking signal, while holding the non-perturbated ones of amplitude, decay rate, frequency, and phase constant, and then observes the effect of that perturbation on the resulting vibration in the next shot cycle. This technique may be useful, for example, for moving these variables outside of local minimums. After achieving an acceptable goal for one of the amplitude, decay rate, and phase, the vibration control system 302 may then apply a perturbation to one of variable that was previously held constant.

In some example implementations, the vibration control system 302 uses one or more optimization approaches to find an optimum braking signal. In one example implantation, the vibration control system 302 uses one or more of Newton's method or extreme seeking.

In certain example implementations where the signal-to-noise ratio of the present vibration signal is sufficient, the vibration control system 302 updates the frequency and phase of the braking signal to match the frequency and phase of the present vibration in the wellbore logging tool.

Modifications, additions, or omissions may be made to method 414 without departing from the scope of the present disclosure. For example, the order of the steps may be performed in a different manner than that described and some steps may be performed at the same time. Additionally, each individual step may include additional steps without departing from the scope of the present disclosure.

Figure 8A:
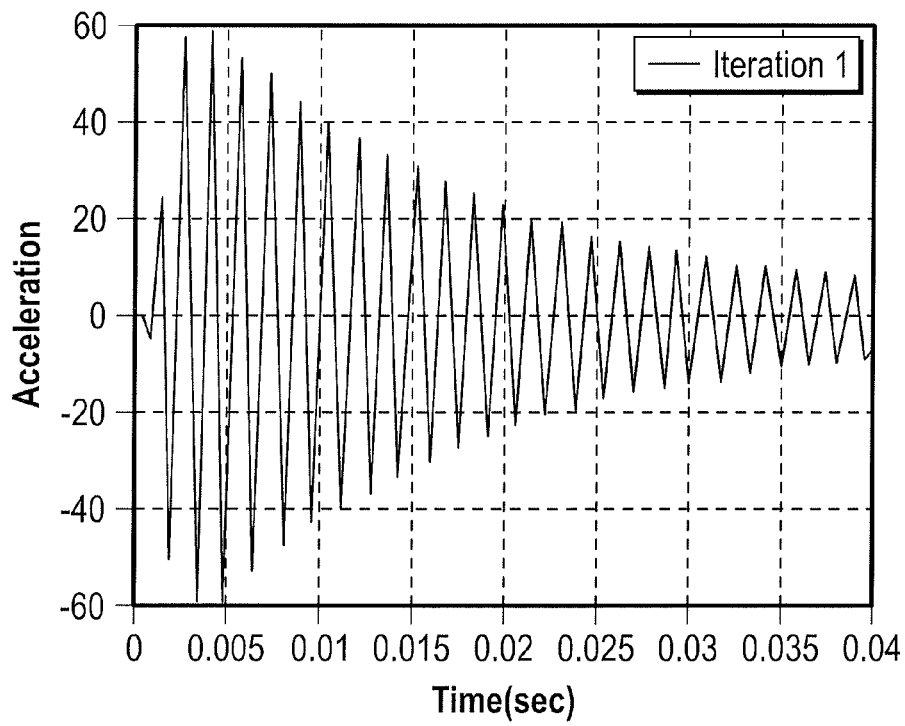
FIGS. 8A, 8B, and 8C illustrate the results from an exemplary embodiment of the method shown in FIGS. 4-7, in accordance with some embodiments of the present disclosure.
Figure 8B:
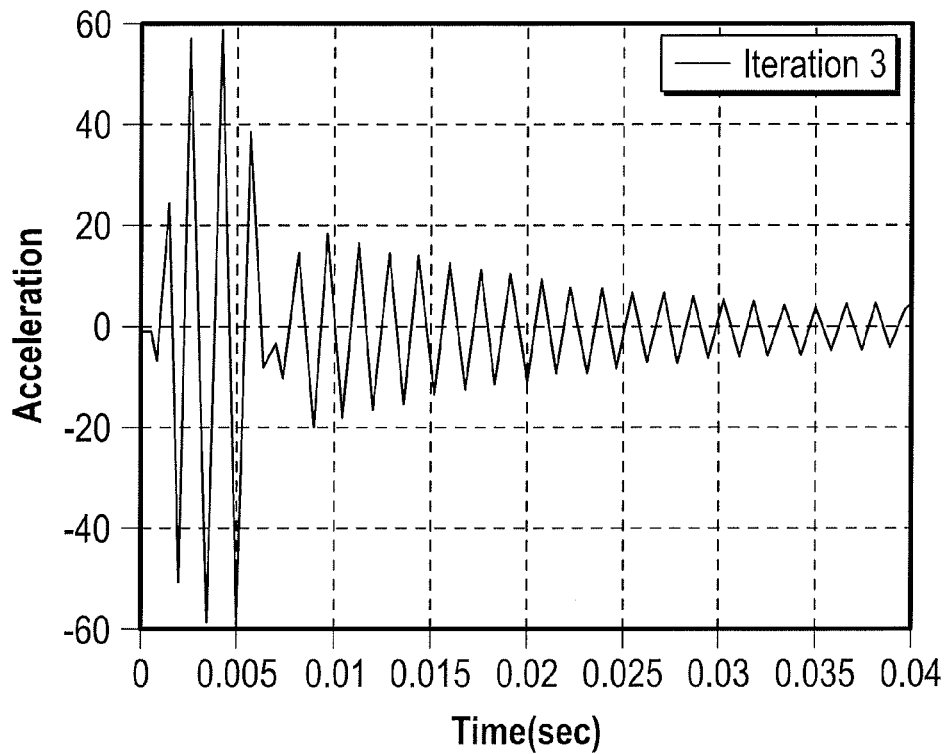
Figure 8C:
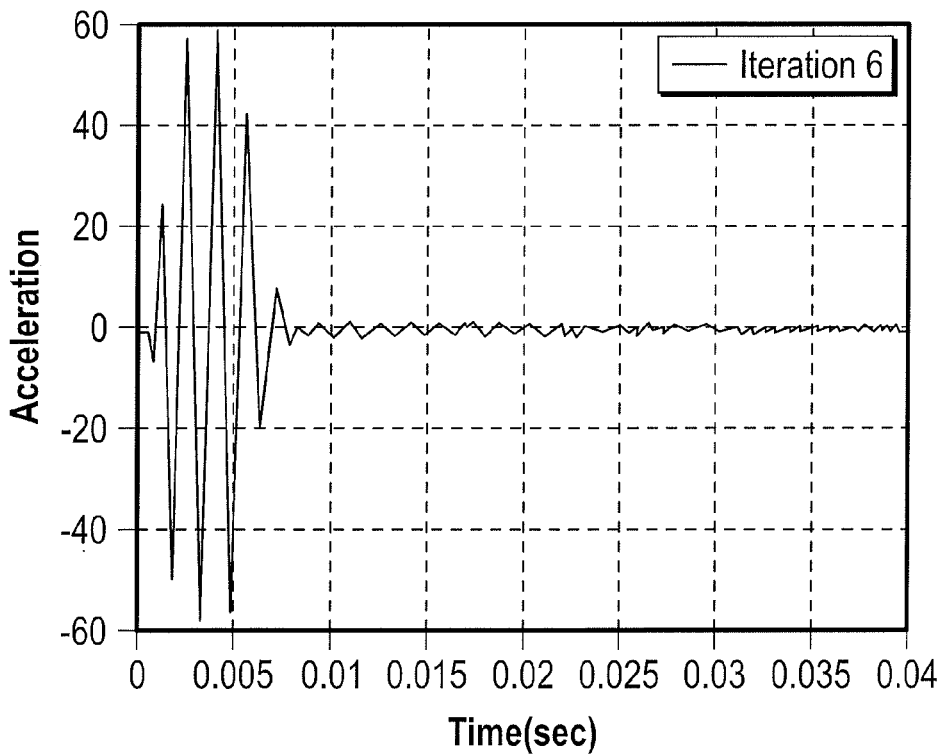

FIGS. 8A, 8B, and 8C illustrate the results from an exemplary embodiment of the method shown in FIG. 4, in accordance with some embodiments of the present disclosure. A simulation was performed comparing an acoustic transmitter without any damping control to an acoustic transmitter using the damping control method described with respect to FIG. 4. FIG. 8A is a graph showing acceleration versus time of the vibration of the acoustic transmitter without any active dampening. FIG. 8B is a graph showing acceleration versus time of the vibration of the acoustic transmitter after three iterations of the active dampening method of FIG. 4. FIG. 8C is a graph showing acceleration versus time of the vibration of the acoustic transmitter after six iterations of the active dampening method of FIG. 4.

To provide illustrations of one or more embodiments of the present disclosure, the following examples are provided. In one embodiment, a method of vibration control for a wellbore logging tool may include providing a braking signal to the acoustic transmitter, determining a present vibration in the acoustic transmitter after the braking signal has been provided to the acoustic transmitter, and determining whether to update the braking signal and, if so, updating the braking signal based, at least in part, on the present vibration in the acoustic transmitter. The wellbore logging tool may include an acoustic transmitter. The braking signal may be based, at least in part, on at least one prior vibration in the acoustic transmitter.

In certain aspects of the disclosed method, the present vibration and the at least one prior vibration may be each characterized by an amplitude, a frequency, a phase, and a decay rate. In certain aspects of the disclosed method, one or more of the amplitude, the frequency, the phase, and the decay rate may be vectors. In one or more of the previously described aspects of the disclosed method, the braking signal may be a function of one or more of an amplitude, a decay rate, a frequency, and a phase. In one or more of the previously described aspects of the disclosed method updating the braking signal based, at least in part, on the present vibration in the acoustic transmitter may further include updating one or more of the amplitude, the decay rate, the frequency, and the phase of the braking signal based, at least in part, on an amplitude of the present vibration of the acoustic transmitter. In one or more of the previously described aspects of the disclosed method, updating one or more of the amplitude, the decay rate, the frequency, and the phase of the braking signal based, at least in part, on an amplitude of the present vibration of the acoustic transmitter further may include using an iterative learning algorithm to update one or more of the amplitude, the decay rate, the frequency, and the phase of the braking signal based, at least in part, on an amplitude of the present vibration of the acoustic transmitter.

In one or more of the previously described aspects of the disclosed method, updating one or more of the amplitude, the decay rate, the frequency, and the phase of the braking signal based, at least in part, on an amplitude of the present vibration of the acoustic transmitter further may include updating one or more of the amplitude, the decay rate, the frequency, and the phase of the braking signal based, at least in part, on an amplitude of the present vibration of the acoustic transmitter by applying a perturbation to one of the amplitude, the decay rate, the frequency, and the phase of the braking signal, while holding the non-perturbed ones of the amplitude, the decay rate, the frequency, and the phase of the braking signal constant. In one or more of the previously described aspects of the disclosed method updating the braking signal based, at least in part, on the present vibration in the acoustic transmitter may further include updating one or more of the amplitude, the decay rate, the frequency, and the phase of the braking signal based, at least in part, on the at least one prior vibration of the acoustic transmitter.

In one or more of the previously described aspects of the disclosed method the wellbore logging tool may be conveyed into a wellbore by a conveyance. The braking signal may be further based on one or more non-linear parameters. The non-linear parameters may be selected from the group consisting of one or more natural frequencies of the wellbore logging tool, one or more natural frequencies of the conveyance, and one or more natural frequencies of the wellbore. In one or more of the previously described aspects of the disclosed method the braking signal may be further based, at least in part, on one or more operating conditions, the operating conditions comprising one or more of a temperature and a pressure.

In one or more of the previously described aspects of the disclosed method the acoustic transmitter may include an electromagnetic transmitter and determining a present vibration in the acoustic transmitter after the braking signal has been provided to the acoustic transmitter further includes measuring a back-electromagnetic force (EMF) signal of the electromagnetic transmitter after the braking signal has been provided to the acoustic transmitter.

In one or more of the previously described aspects of the disclosed method, the acoustic transmitter includes an piezoelectric transmitter and determining a present vibration in the acoustic transmitter after the braking signal has been provided to the acoustic transmitter may further include measuring a current of the piezoelectric transmitter, wherein the current of the piezoelectric transmitter is caused, at least in part, by a change in pressure resulting from the present vibration in the wellbore logging tool.

In one or more of the previously described aspects of the disclosed method, determining a present vibration in the acoustic transmitter after the braking signal has been sent to the wellbore logging tool may further include measuring an acceleration using an accelerometer.

In one or more of the previously described aspects of the disclosed method updating the braking signal based, at least in part, on the present vibration in the acoustic transmitter may further include updating an amplitude of the braking signal based, at least in part, an amplitude step value, updating a decay rate of the braking signal based, at least in part, on a decay rate step value, updating a frequency of the braking signal based, at least in part, on a frequency step value, updating a phase of the braking signal based, at least in part, on a phase step value.

In one or more of the previously described aspects of the disclosed method, the method may further include providing a drive signal to the acoustic transmitter.

In one embodiment, a method of vibration control for a wellbore logging tool may include determining an initial braking signal, providing the initial braking signal to the acoustic transmitter, determining a present vibration in the acoustic transmitter after the initial braking signal has been transmitted to the acoustic transmitter, and determining whether to update the initial braking signal and, if so, updating the initial braking signal based, at least in part, on the present vibration in the acoustic transmitter. The wellbore logging tool may include an acoustic transmitter.

In certain aspects of the disclosed method, determining the initial braking signal may include providing a test drive signal to the acoustic transmitter without an accompanying braking signal, determining the present vibration in the acoustic transmitter after the test drive signal has been transmitted to the wellbore logging tool, and generating the initial braking signal based, at least in part, on the present vibration in the acoustic transmitter.

In one or more of the previously described aspects of the disclosed method, determining the initial braking signal may include selecting the initial braking signal from a braking signal database based, at least in part, on a temperature and a pressure.

In one embodiment, a wellbore logging system for logging a wellbore may include a conveyance, a wellbore logging tool connected to the conveyance and suspended in the wellbore, the wellbore logging tool comprising an acoustic transmitter, and a vibration control system communicatively coupled to the wellbore logging tool. The vibration control system may include a processor and a memory communicatively coupled to the processor. The memory may include non-transitory machine readable instructions, that, when executed, may cause the processor to provide a braking signal to the acoustic transmitter, wherein the braking signal is based, at least in part, on at least one prior vibration in the acoustic transmitter, determine a present vibration in the acoustic transmitter after the braking signal has been transmitted to the acoustic transmitter, and determine whether to update the braking signal and, if so, updating the braking signal based, at least in part, on the present vibration in the acoustic transmitter.

In certain aspects of the disclosed wellbore logging system, the present vibration and the at least one prior vibration may be each characterized by an amplitude, a frequency, a phase, and a decay rate. In certain aspects of the disclosed wellbore logging system, one or more of the amplitude, the frequency, the phase, and the decay rate may be vectors. In certain aspects of the disclosed wellbore logging system, the braking signal may be a function of one or more of an amplitude, a decay rate, a frequency, and a phase.

In one or more of the previously described aspects of the disclosed wellbore logging system, the executable instructions that cause the processor to update the braking signal based, at least in part, on the present vibration of the acoustic transmitter may further cause the processor to update one or more of the amplitude, the decay rate, the frequency, and the phase of the braking signal based, at least in part, on an amplitude of the present vibration of the acoustic transmitter.

In one or more of the previously described aspects of the disclosed wellbore logging system, the executable instructions that may cause the processor to update one or more of the amplitude, the decay rate, the frequency, and the phase of the braking signal based, at least in part, on an amplitude of the present vibration of the acoustic transmitter may further cause the processor to use a iterative learning algorithm to update one or more of the amplitude, the decay rate, the frequency, and the phase of the braking signal based, at least in part, on an amplitude of the present vibration of the acoustic transmitter.

In one or more of the previously described aspects of the disclosed wellbore logging system, the executable instructions that may cause the processor to update one or more of the amplitude, the decay rate, the frequency, and the phase of the braking signal based, at least in part, on an amplitude of the present vibration of the acoustic transmitter may further cause the processor to update one or more of the amplitude, the decay rate, the frequency, and the phase of the braking signal based, at least in part, on an amplitude of the present vibration of the acoustic transmitter tool by applying a perturbation to one of the amplitude, the decay rate, the frequency, and the phase of the braking signal, while holding the non-perturbed ones of the amplitude, the decay rate, the frequency, and the phase of the braking signal constant.

In one or more of the previously described aspects of the disclosed wellbore logging system, n the executable instructions that may cause the processor to update the braking signal based, at least in part, on the present vibration in the acoustic transmitter may further cause the processor to update one or more of the amplitude, the decay rate, the frequency, and the phase of the braking signal based, at least in part, on the at least one prior vibration of the acoustic transmitter.

In one or more of the previously described aspects of the disclosed wellbore logging system, the braking signal may be further based on one or more non-linear parameters. The non-linear parameters may be selected from the group consisting of one or more natural frequencies of the wellbore logging tool, one or more natural frequencies of the conveyance, and one or more natural frequencies of the wellbore.

In one or more of the previously described aspects of the disclosed wellbore logging system, the braking signal may be further based, at least in part, on one or more operating conditions, the operating conditions comprising one or more of a temperature and a pressure.

In one or more of the previously described aspects of the disclosed wellbore logging system, the acoustic transmitter may include an electromagnetic transmitter. The executable instructions that cause the processor to determine a present vibration in the wellbore logging tool after the braking signal has been provided to the acoustic transmitter may further cause the processor to measure a back-electromagnetic force (EMF) signal of the electromagnetic transmitter after the braking signal has been provided to the acoustic transmitter.

In one or more of the previously described aspects of the disclosed wellbore logging system, the acoustic transmitter may include an piezoelectric transmitter. The executable instructions that cause the processor to determine a present vibration in the wellbore logging tool after the braking signal has been sent to the wellbore logging tool may further cause the processor to measure a current of the piezoelectric transmitter, wherein the current of the piezoelectric transmitter is caused, at least in part, by a change in pressure resulting from the present vibration in the wellbore logging tool.

In one or more of the previously described aspects of the disclosed wellbore logging system, the executable instructions that may cause the processor to determine a present vibration in the wellbore logging tool after the braking signal has been sent to the wellbore logging tool may further cause the processor to receive an acceleration measurement from an accelerometer.

In one or more of the previously described aspects of the disclosed wellbore logging system, the executable instructions that may cause the processor to update the braking signal based, at least in part, on the present vibration in the acoustic transmitter may further cause the processor to update an amplitude of the braking signal based, at least in part, an amplitude step value, update a decay rate of the braking signal based, at least in part, on a decay rate step value, update a frequency of the braking signal based, at least in part, on a frequency step value, and update a phase of the braking signal based, at least in part, on a phase step value.

In one or more of the previously described aspects of the disclosed wellbore logging system, the executable instructions may further cause the processor to provide a drive signal to the acoustic transmitter.

In one embodiment, a wellbore logging system for logging a wellbore may include a conveyance, a wellbore logging tool connected to the conveyance and suspended in the wellbore, the wellbore logging tool may include an acoustic transmitter, and a vibration control system communicatively coupled to the wellbore logging tool. The vibration control system may include a processor and a memory communicatively coupled to the processor. The memory may include non-transitory machine readable instruction, that, when executed, may cause the processor to determine an initial braking signal, provide a drive signal to the acoustic transmitter, provide the initial braking signal to the acoustic transmitter, determine a present vibration in the wellbore acoustic transmitter after the initial braking signal has been provided to the acoustic transmitter, and determine whether to update the initial braking signal and, if so, update the initial braking signal based, at least in part, on the present vibration in the acoustic transmitter.

In certain aspects of the disclosed wellbore logging system, the executable instructions that cause the processor to determine the initial braking signal may further cause the processor to provide a test drive signal to the acoustic transmitter without an accompanying braking signal, determine the present vibration in the acoustic transmitter after the test drive signal has been transmitted to the wellbore logging tool, and generate the initial braking signal based, at least in part, on the present vibration in the acoustic transmitter.

In certain aspects of the disclosed wellbore logging system, the executable instructions that cause the processor to determine the initial braking signal may further cause the processor to select the initial braking signal from a braking signal database based, at least in part, on a temperature and a pressure.

Although the present disclosure and its advantages have been described in detail, it should be understood that various changes, substitutions and alterations can be made herein without departing from the spirit and scope of the disclosure as defined by the following claims.

What is claimed is:

1. A method of vibration control for a wellbore logging tool, the wellbore logging tool comprising an acoustic transmitter, the method comprising:
    providing a braking signal to the acoustic transmitter, wherein the braking signal is based, at least in part, on at least one prior vibration in the acoustic transmitter;
    determining a present vibration in the acoustic transmitter after the braking signal has been provided to the acoustic transmitter; and
    determining whether to update the braking signal and, if so, updating the braking signal based, at least in part, on the present vibration in the acoustic transmitter, and wherein the braking signal is a function of one or more of a frequency and a phase of the present vibration in the acoustic transmitter.

2. The method of claim 1, wherein the present vibration and the at least one prior vibration are each characterized by an amplitude, a frequency, a phase, and a decay rate.

3. The method of claim 2, wherein one or more of the amplitude, the frequency, the phase, and the decay rate are vectors.

4. The method of any of claim 1, wherein the braking signal is a function of one or more of an amplitude and a decay rate of the present vibration in the acoustic transmitter.

5. The method of claim 4, wherein updating the braking signal based, at least in part, on the present vibration in the acoustic transmitter further comprises:
    updating one or more of the amplitude, the decay rate, the frequency, and the phase of the braking signal based, at least in part, on an amplitude of the present vibration of the acoustic transmitter.

6. The method of claim 5, wherein updating one or more of the amplitude, the decay rate, the frequency, and the phase of the braking signal based, at least in part, on an amplitude of the present vibration of the acoustic transmitter further comprises:
using an iterative learning algorithm to update one or more of the amplitude, the decay rate, the frequency, and the phase of the braking signal based, at least in part, on an amplitude of the present vibration of the acoustic transmitter.

7. The method of claim 5, wherein updating one or more of the amplitude, the decay rate, the frequency, and the phase of the braking signal based, at least in part, on an amplitude of the present vibration of the acoustic transmitter further comprises:
updating one or more of the amplitude, the decay rate, the frequency, and the phase of the braking signal based, at least in part, on an amplitude of the present vibration of the acoustic transmitter by applying a perturbation to one of the amplitude, the decay rate, the frequency, and the phase of the braking signal, while holding the non-perturbed ones of the amplitude, the decay rate, the frequency, and the phase of the braking signal constant.

8. The method of claim 5, wherein updating the braking signal based, at least in part, on the present vibration in the acoustic transmitter further comprises:
updating one or more of the amplitude, the decay rate, the frequency, and the phase of the braking signal based, at least in part, on the at least one prior vibration of the acoustic transmitter.

9. The method of claim 4, wherein the wellbore logging tool is conveyed into a wellbore by a conveyance, and wherein the braking signal is further based on one or more non-linear parameters, the non-linear parameters selected from the group consisting of:
one or more natural frequencies of the wellbore logging tool;
one or more natural frequencies of the conveyance; and
one or more natural frequencies of the wellbore.

10. The method of claim 4, wherein the braking signal is further based, at least in part, on one or more operating conditions, the operating conditions comprising one or more of a temperature and a pressure.

11. The method of claim 1, wherein the acoustic transmitter includes an electromagnetic transmitter and wherein determining a present vibration in the acoustic transmitter after the braking signal has been provided to the acoustic transmitter further comprises:
measuring a back-electromagnetic force (EMF) signal of the electromagnetic transmitter after the braking signal has been provided to the acoustic transmitter.

12. The method of claim 1, wherein the acoustic transmitter includes an piezoelectric transmitter and wherein determining a present vibration in the acoustic transmitter after the braking signal has been provided to the acoustic transmitter further comprises:
measuring a current of the piezoelectric transmitter, wherein the current of the piezoelectric transmitter is caused, at least in part, by a change in pressure resulting from the present vibration in the wellbore logging tool.

13. The method of claim 1, wherein determining a present vibration in the acoustic transmitter after the braking signal has been sent to the wellbore logging tool further comprises:
measuring an acceleration using an accelerometer.

14. The method of claim 1, wherein updating the braking signal based, at least in part, on the present vibration in the acoustic transmitter comprises:
updating an amplitude of the braking signal based, at least in part, an amplitude step value;
updating a decay rate of the braking signal based, at least in part, on a decay rate step value;
updating a frequency of the braking signal based, at least in part, on a frequency step value; and
updating a phase of the braking signal based, at least in part, on a phase step value.

15. The method of claim 1, further comprising:
providing a drive signal to the acoustic transmitter.

16. A method of vibration control for a wellbore logging tool, the wellbore logging tool comprising an acoustic transmitter, the method comprising:
determining an initial braking signal;
providing the initial braking signal to the acoustic transmitter;
determining a present vibration in the acoustic transmitter after the initial braking signal has been transmitted to the acoustic transmitter; and
determining whether to update the initial braking signal and, if so, updating the initial braking signal based, at least in part, on the present vibration in the acoustic transmitter, and wherein the braking signal is a function of one or more of a frequency and a phase of the present vibration in the acoustic transmitter.

17. The method of claim 16, wherein determining the initial braking signal comprises:
providing a test drive signal to the acoustic transmitter without an accompanying braking signal;
determining the present vibration in the acoustic transmitter after the test drive signal has been transmitted to the wellbore logging tool; and
generating the initial braking signal based, at least in part, on the present vibration in the acoustic transmitter.

18. The method of claim 16, wherein determining the initial braking signal comprises:
selecting the initial braking signal from a braking signal database based, at least in part, on a temperature and a pressure.

19. A wellbore logging system for logging a wellbore, comprising:
a conveyance;
a wellbore logging tool connected to the conveyance and suspended in the wellbore, the wellbore logging tool comprising an acoustic transmitter; and
a vibration control system communicatively coupled to the wellbore logging tool, the vibration control system including:
a processor; and
a memory communicatively coupled to the processor, the memory including non-transitory machine readable instruction, that, when executed, cause the processor to:
provide a braking signal to the acoustic transmitter, wherein the braking signal is based, at least in part, on at least one prior vibration in the acoustic transmitter;
determine a present vibration in the acoustic transmitter after the braking signal has been transmitted to the acoustic transmitter; and
determine whether to update the braking signal and, if so, updating the braking signal based, at least in part, on the present vibration in the acoustic transmitter, and wherein the braking signal is a function of one or more of a frequency and a phase of the present vibration in the acoustic transmitter.

20. The wellbore logging system of claim 19, wherein the present vibration and the at least one prior vibration are each characterized by an amplitude, a frequency, a phase, and a decay rate.

21. The wellbore logging system of claim 20, wherein one or more of the amplitude, the frequency, the phase, and the decay rate are vectors.

22. The wellbore logging system of claim 19, wherein the braking signal is a function of one or more of an amplitude and a decay rate of the present vibration in the acoustic transmitter.

23. The wellbore logging system of claim 19, wherein the executable instructions that cause the processor to update the braking signal based, at least in part, on the present vibration of the acoustic transmitter further cause the processor to:
update one or more of the amplitude, the decay rate, the frequency, and the phase of the braking signal based, at least in part, on an amplitude of the present vibration of the acoustic transmitter.

24. The wellbore logging system of claim 23, wherein the executable instructions that cause the processor to update one or more of the amplitude, the decay rate, the frequency, and the phase of the braking signal based, at least in part, on an amplitude of the present vibration of the acoustic transmitter further cause the processor to:
use a iterative learning algorithm to update one or more of the amplitude, the decay rate, the frequency, and the phase of the braking signal based, at least in part, on an amplitude of the present vibration of the acoustic transmitter.

25. The wellbore logging system of claim 23, wherein the executable instructions that cause the processor to update one or more of the amplitude, the decay rate, the frequency, and the phase of the braking signal based, at least in part, on an amplitude of the present vibration of the acoustic transmitter further cause the processor to:
update one or more of the amplitude, the decay rate, the frequency, and the phase of the braking signal based, at least in part, on an amplitude of the present vibration of the acoustic transmitter tool by applying a perturbation to one of the amplitude, the decay rate, the frequency, and the phase of the braking signal, while holding the non-perturbed ones of the amplitude, the decay rate, the frequency, and the phase of the braking signal constant.

26. The wellbore logging system of claim 23, wherein the executable instructions that cause the processor to update the braking signal based, at least in part, on the present vibration in the acoustic transmitter further cause the processor to:
update one or more of the amplitude, the decay rate, the frequency, and the phase of the braking signal based, at least in part, on the at least one prior vibration of the acoustic transmitter.

27. The wellbore logging system of claim 21, wherein the braking signal is further based on one or more non-linear parameters, the non-linear parameters selected from the group consisting of:
one or more natural frequencies of the wellbore logging tool;
one or more natural frequencies of the conveyance; and
one or more natural frequencies of the wellbore.

28. The wellbore logging system of claim 22, wherein the braking signal is further based, at least in part, on one or more operating conditions, the operating conditions comprising one or more of a temperature and a pressure.

29. The wellbore logging system of claim 19, wherein:
the acoustic transmitter comprises an electromagnetic transmitter; and
wherein the executable instructions that cause the processor to determine a present vibration in the wellbore logging tool after the braking signal has been provided to the acoustic transmitter further cause the processor to:
measure a back-electromagnetic force (EMF) signal of the electromagnetic transmitter after the braking signal has been provided to the acoustic transmitter.

30. The wellbore logging system of claim 19, wherein:
the acoustic transmitter comprises an piezoelectric transmitter; and
the executable instructions that cause the processor to determine a present vibration in the wellbore logging tool after the braking signal has been sent to the wellbore logging tool further cause the processor to:
measure a current of the piezoelectric transmitter, wherein the current of the piezoelectric transmitter is caused, at least in part, by a change in pressure resulting from the present vibration in the wellbore logging tool.

31. The wellbore logging system of claim 19, wherein the executable instructions that cause the processor to determine a present vibration in the wellbore logging tool after the braking signal has been sent to the wellbore logging tool further cause the processor to:
receive an acceleration measurement from an accelerometer.

32. The wellbore logging system of claim 19, wherein the executable instructions that cause the processor to update the braking signal based, at least in part, on the present vibration in the acoustic transmitter further cause the processor to:
update an amplitude of the braking signal based, at least in part, on an amplitude step value;
update a decay rate of the braking signal based, at least in part, on a decay rate step value;
update a frequency of the braking signal based, at least in part, on a frequency step value; and
update a phase of the braking signal based, at least in part, on a phase step value.

33. The wellbore logging system of claim 19, wherein the executable instructions further cause the processor to:
provide a drive signal to the acoustic transmitter.

34. A wellbore logging system for logging a wellbore, comprising:
a conveyance;
a wellbore logging tool connected to the conveyance and suspended in the wellbore, the wellbore logging tool comprising an acoustic transmitter; and
a vibration control system communicatively coupled to the wellbore logging tool, the vibration control system including:
a processor; and
a memory communicatively coupled to the processor, the memory including non-transitory machine readable instruction, that, when executed, cause the processor to:
determine an initial braking signal;
provide a drive signal to the acoustic transmitter;
provide the initial braking signal to the acoustic transmitter;
determine a present vibration in the wellbore acoustic transmitter after the initial braking signal has been provided to the acoustic transmitter; and
determine whether to update the initial braking signal and, if so, updating the initial braking signal based, at least in part, on the present vibration in the acoustic transmitter, and wherein the braking signal is a function of one or more of a frequency and a phase of the present vibration in the acoustic transmitter.

35. The wellbore logging system of claim 34, wherein the executable instructions that cause the processor to determine the initial braking signal further cause the processor to:
provide a test drive signal to the acoustic transmitter without an accompanying braking signal;
determine the present vibration in the acoustic transmitter after the test drive signal has been transmitted to the wellbore logging tool; and
generate the initial braking signal based, at least in part, on the present vibration in the acoustic transmitter.

36. The wellbore logging system of claim 34, wherein the executable instructions that cause the processor to determine the initial braking signal further cause the processor to:
select the initial braking signal from a braking signal database based, at least in part, on a temperature and a pressure.

* * * * *